United States Patent
Bae et al.

(10) Patent No.: US 8,432,844 B2
(45) Date of Patent: Apr. 30, 2013

(54) LOW-POWER METHOD FOR MEDIA ACCESS CONTROL IN SEMI-LINEAR SENSOR NETWORK

(75) Inventors: Myung Nam Bae, Daejeon (KR); Byung Bog Lee, Daejeon (KR); Byeong Cheol Choi, Daejeon (KR); Jae Hong Ruy, Daejeon (KR); In Hwan Lee, Daejeon (KR); Jong-Arm Jun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 437 days.

(21) Appl. No.: 12/773,118

(22) Filed: May 4, 2010

(65) Prior Publication Data

US 2011/0134818 A1   Jun. 9, 2011

(30) Foreign Application Priority Data

Dec. 4, 2009   (KR) .................. 10-2009-0119738

(51) Int. Cl.
*G08C 17/00*   (2006.01)
(52) U.S. Cl.
USPC ............ 370/311; 370/351; 370/392; 370/431
(58) Field of Classification Search .................. None
See application file for complete search history.

(56) References Cited

U.S. PATENT DOCUMENTS

| | | | |
|---|---|---|---|
| 6,643,469 B1 * | 11/2003 | Gfeller et al. ................ | 398/162 |
| 7,428,229 B2 | 9/2008 | Bonta et al. | |
| 2006/0050825 A1 * | 3/2006 | Page .......................... | 375/356 |
| 2006/0140135 A1 * | 6/2006 | Bonta et al. ................... | 370/254 |
| 2006/0285579 A1 * | 12/2006 | Rhee et al. .................... | 375/132 |
| 2007/0280394 A1 * | 12/2007 | Fung et al. .................... | 375/362 |
| 2009/0103437 A1 | 4/2009 | Kim et al. | |
| 2009/0103564 A1 | 4/2009 | Lee et al. | |
| 2011/0211513 A1 * | 9/2011 | Coleri Eregen et al. ...... | 370/311 |

FOREIGN PATENT DOCUMENTS

| | | |
|---|---|---|
| KR | 1020090015687 A | 2/2009 |
| KR | 2009-0040726 A | 4/2009 |
| KR | 20090040127 A | 4/2009 |
| KR | 1020090032319 A | 4/2009 |

OTHER PUBLICATIONS

Michael Buettner, et al; "X-MAC: A Short Preamble MAC Protocol for Duty-Cycled Wireless Sensor Networks", SenSys '06, Nov. 1-3, 2006, Boulder, Colorado, USA, pp. 307-320.

(Continued)

*Primary Examiner* — Andrew Chriss
*Assistant Examiner* — Salvador E Rivas
(74) *Attorney, Agent, or Firm* — Ladas & Parry LLP

(57) ABSTRACT

A low-power method for media access control on a semi-linear sensor network with multiple sensor nodes, includes: sensing a channel after waking up from a sleep mode by an arbitrary transmission sensor node that has obtained data; and generating a long preamble including a number of element preambles and sending to a destination sensor node after said channel sensing. This method further includes: sending said data to said destination sensor node after completion of transmission of said long preamble; and identifying duty cycle information of said destination sensor node after completion of transmission of said data and adjusting the number of said element preambles according to said duty cycle information.

18 Claims, 10 Drawing Sheets

OTHER PUBLICATIONS

Marco Avvenuti, et al; "Increasing the efficiency of preamble sampling protocols for wireless sensor networks", Proceedings of the First Mobile Computing and Wireless Communication International Conference, 2006, MCWC 2006, Sep. 17-20, 2006, pp. 1-6.

Ajit Warrier, et al; "Z-MAC: a Hybrid MAC for Wireless Sensor Networks", Sigcomm 05, Philidelphia, PA, USA, Aug. 22-26, 2005, pp. 1-2.

* cited by examiner

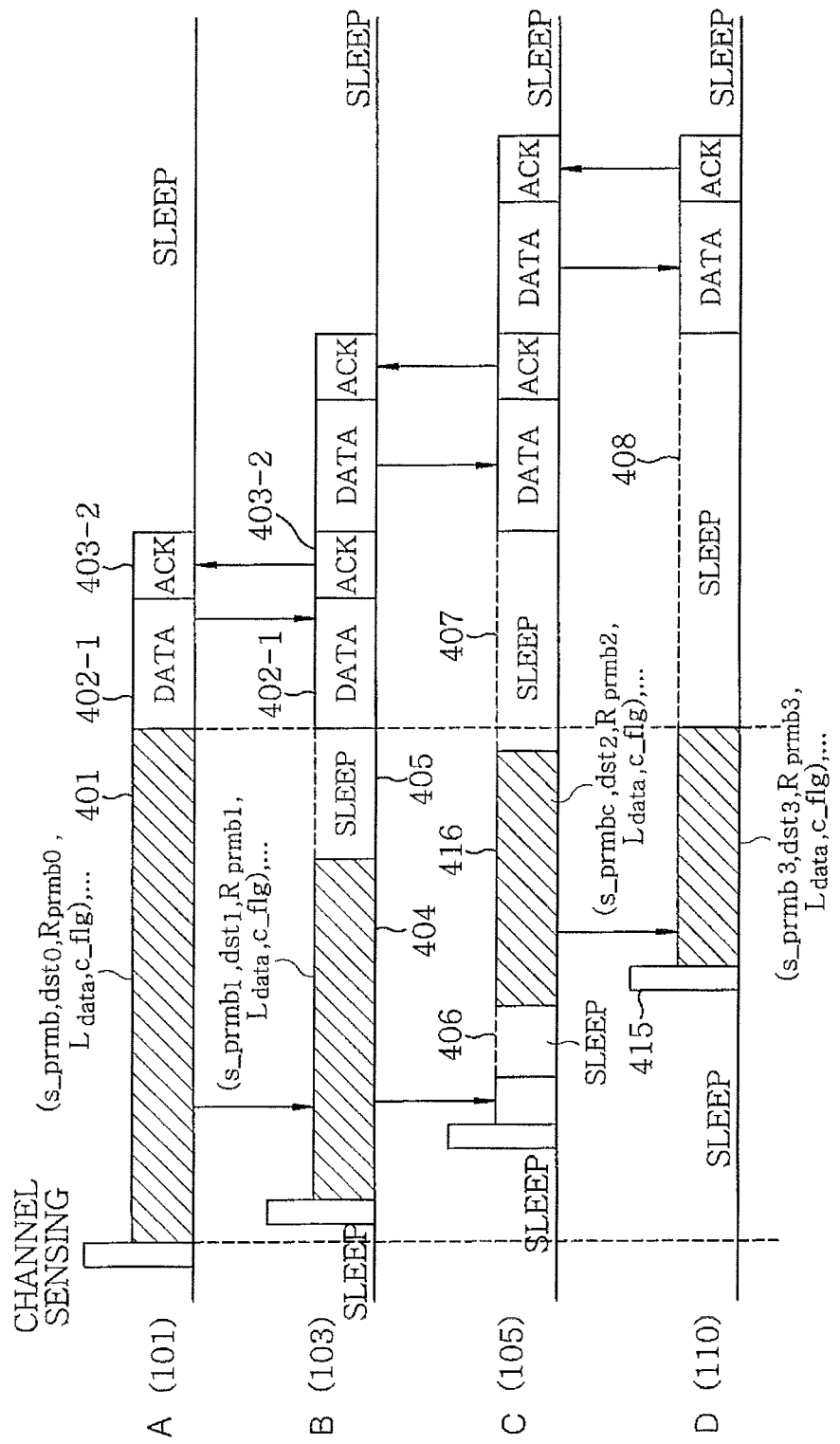

LOW-POWER METHOD FOR MEDIA ACCESS CONTROL IN SEMI-LINEAR SENSOR NETWORK

CROSS-REFERENCE(S) TO RELATED APPLICATION

The present invention claims priority of Korean Patent Application No. 10-2009-0119738, filed on Dec. 4, 2009, which is incorporated herein by reference.

FIELD OF THE INVENTION

The present invention relates to a media access control method for communication in a sensor network, and, more particularly, to a low-power method for media access control in a semi-linear sensor network which not only minimizes a sleep delay through transmission of data in several hops in a single cycle by using idle time of a long preamble in a semi-linear sensor network environment but also allows low-power and real-time characteristics by using cycle period adjustment reflecting a duty cycle of sensor nodes on a receiving side, unnecessary standby and overhearing removal method.

BACKGROUND OF THE INVENTION

In general, a sensor network includes a set of sensor nodes as its basic unit. Its application service is primarily to exchange and control necessary information through wireless communication among these sensor nodes, which has been recently extended a great deal to accident surveillance of several kinds, real-time information gathering as well as some application fields that require reliability.

For sensor network application services such as accident surveillance of several kinds, real-time information gathering, it needs to resolve issues like collision avoidance resulting from several factors in order to ensure real-time surveillance based on accidents or reliability and at the same time the sensor network should be able to survive for a sufficiently long period of time. In this regard, a low-power method for media access control is of great importance in order to improve the efficiency in energy consumption and maintenance cost for a network of sensor nodes that use a limited energy source based on batteries.

Nonetheless, the development of most conventional communication techniques has been focused on low-power communication techniques and the low-power communication techniques that have been proposed until now use a method that lowers the power consumption primarily by repeating a cycle of motion and sleep in order to minimize unnecessary movements.

On the other hand, it has been well known that because a radio-frequency transceiver, i.e., a communication module, consumes energy tens or hundreds of times more than a microcontroller unit in general, the energy consumption is mostly due to idle listening and overhearing, particularly in a sensor network environment, that is, when a transceiver spends energy as it continuously stands by for reception even in a situation without any transmission sensor node and when neighboring nodes that do not participate in transmission receive packets unnecessarily, respectively. Therefore, in order to attain low-power operation, a given cycle of wakeup, execution and sleep is employed and then the energy consumption of a node is reduced effectively by adopting a low duty cycle with an elongated period.

SUMMARY OF THE INVENTION

With a low duty cycle employed, however, a packet can be sent once in a very long period, one hop, so that one has to wait for a next receiving node in sleep state to wake up and get into action for every hop on the entire sensor network, giving rise to a sleep delay. It is commonly known that such sleep delay is the most prominent reason for the delay of packet transmission and the energy efficiency is inversely proportional to the transmission throughput in a sensor network.

Put otherwise, if the duty cycle is increased in order to increase the transmission throughput, then idle listening gets increased, leading to a reduction of energy efficiency. On the other hand, if the duty cycle is decreased in order to increase energy efficiency, then sleep delay gets increased so that the transmission throughput gets lowered.

A sensor network should not only satisfy minimal transmission latency but also prevent the sensor nodes from being replaced by ensuring a long-term operation in application cases in a sensor network such as event report or surveillance. However, the conventional methods for media access control in a sensor network have great difficulties in satisfying the two mutually exclusive aspects, transmission throughput and energy efficiency, in these applications.

Therefore, the present invention aims at providing with a low-power method for media access control in a semi-linear sensor network that allows minimizing sleep delay through data transmission in several hops in a single cycle by utilizing idle time of a long preamble in a semi-linear sensor network and low-power and real-time characteristics by employing cycle period adjustment reflecting a duty cycle of a reception sensor node, unnecessary standby of reception and an overhearing removal technique.

In accordance with an embodiment of the present invention, there is provided a low-power method for media access control on a semi-linear sensor network with multiple sensor nodes, which includes sensing a channel after waking up from a sleep mode by an arbitrary transmission sensor node that has obtained data; generating a long preamble having a number of element preambles and sending to a destination sensor node after the channel sensing; sending said data to the destination sensor node after completion of transmission of the long preamble; and identifying duty cycle information of the destination sensor node after completion of transmission of the data and adjusting the number of the element preambles according to the duty cycle information.

It is preferable that the data sending has examining status of a channel through which the data are to be sent for transmission of data to the destination sensor node after completion of transmission of the long preamble; solving collisions if the channel is in a contention period where data collision takes place; and sending data to the destination sensor node after completion of collision resolution.

It is also preferable that the method further includes determining a point of time at which the element preambles are sent according to duty cycle information of the destination sensor node after completion of transmission of the data.

It is desired that the element preambles have a destination address, remainder of preamble, length of data and collision avoidance (CA) flag information and the CA flag information keeps information about whether or not collisions between the transmission sensor node and destination sensor node has been resolved.

In addition, in accordance with another embodiment of the present invention, there is provided with a low-power method for media access control on a semi-linear sensor network with multiple sensor nodes, which includes receiving a long preamble including multiple element preambles in an arbitrary reception sensor node after channel sensing at a transmission sensor node in said sensor network; examining destination information of said element preamble at the reception sensor node in said sensor network to identify if said sensor node is a destination sensor node; switching the destination sensor node into a sleep state after calculating a wake-up time for data reception from the transmission sensor node; receiving data sent from the transmission sensor node upon waking up from sleep mode at the wake-up time; and resending the data to next destination sensor node after completion of receiving the data.

It is desirable that the receiving data has waking up the destination sensor node from sleep mode at a time of data transmission from the transmission sensor node; examining if a channel at the time of data transmission is in a contention period during which collisions take place; performing a collision resolution through a transmission process of RTS and CTS between the transmission sensor node and the destination sensor node if in the contention period; and receiving the data in an idle mode of the channel due to the collision resolution.

It is also desirable that the data resending has examining if it is possible to resend the received data to next destination sensor node after completion of receiving the data; and resending the data to the next destination sensor node if resending is estimated possible by the examination.

It is preferable that the data resending has examining if a channel at the time of data resending is in a contention period during which collisions take place; performing a collision resolution through a transmission process of RTS and CTS between the destination sensor node and next destination sensor node if in the contention period; and sending the data to the next destination sensor node in an idle mode of the channel due to the collision resolution.

It is desired that the present method further includes receiving duty cycle information of the next destination sensor node by the destination sensor node after completion of resending the data; and adjusting the number of element preambles and next duty cycle if the duty cycle information has been changed.

It is also preferable that the present method further includes switching the destination sensor node into a sleep state immediately if the duty cycle information has not been changed.

The wake-up time of the destination sensor node is calculated by using the remainder of preamble and data length information in the element preambles and if additional data exists in the destination sensor node due to a failure during previous transmission, a wake-up time of the destination sensor node is calculated by adding a transmission time interval for the additional data.

The destination sensor node is kept further in sleep mode for a next duty cycle, the time interval to next channel sensing in the course of transmission, if it is not immediately possible to send element preambles to the next destination sensor node at the wake-up time.

The present invention has an advantage to satisfy real-time characteristics through a method to control the respective sensor nodes so as to work without idle time set in accordance with the estimation for participation in the data transmission. The transmission sensor node sends repeatedly element preambles including a destination address, remainder of the preamble, length of data and collision avoidance (CA) flag information in a long preamble and the reception sensor node provides with its own duty cycle information to ACK confirming reception of data to the transmission sensor node.

If a reception sensor node has a sufficient time until the data/control period after recognizing itself as the destination, transmission of a preamble to the next sensor node in this interval is permitted and in the presence of the response to this by the next sensor node, it is possible to send immediately to the next sensor node without a sleep delay. On the other hand, if a reception sensor node does not have a sufficient time interval, the sensor node is immediately turned into a sleep state so that it is possible to increase the efficiency of energy consumption in the sensor node.

The method for media access control in a semi-linear sensor network of the present invention is capable of reducing additional energy and transmission time consumption due to collision by minimizing sleep delay on the course of transmission. Because the sensor network can dynamically alter the number of preambles and time of transmission through transmission of information about duty cycle in the reverse direction of the transmission path, the efficiency of energy consumption can be increased by minimizing transmission of unnecessary long preambles. The present method for media access control is also capable of providing with reliability in the presence of various collisions that could take place in a real sensor network environment by informing the sensor nodes on the transmission path of the occurrence of collisions through transmission of collision detection information.

BRIEF DESCRIPTION OF THE DRAWINGS

The above and other objects and features of the present invention will become apparent from the following description of embodiments, given in conjunction with the accompanying drawings, in which:

FIGS. 4A and 4B describe an example of dynamic adjustment of a long preamble in accordance with an embodiment of the present invention;

DETAILED DESCRIPTION OF THE EMBODIMENTS

Hereinafter, embodiments of the present invention will be described in detail with reference to the accompanying drawings which form a part hereof.

Figure 1:
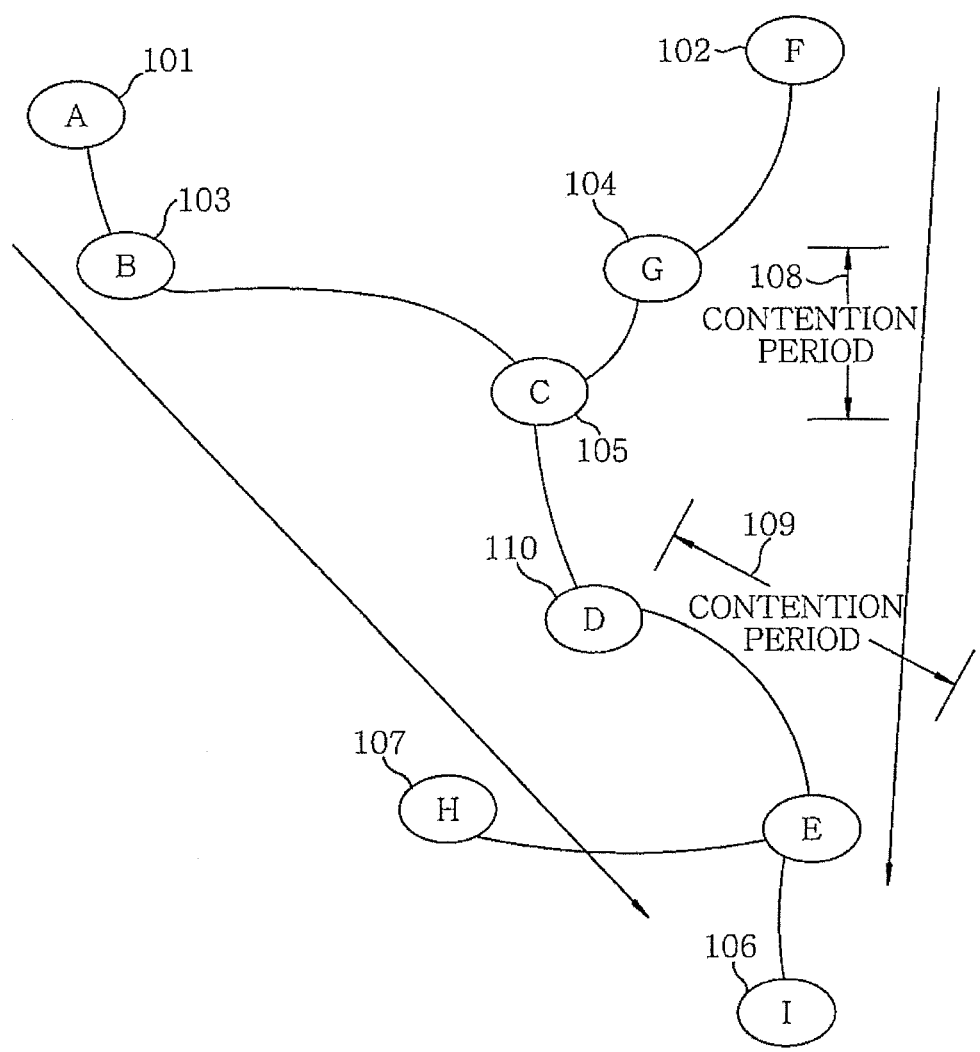
FIG. 1 shows an example of a semi-linear sensor network in accordance with an embodiment of the present invention.

FIG. 1 shows an example of a semi-linear sensor network in accordance with an embodiment of the present invention. Here, it is assumed that most traffic is transmitted in a constant direction in a sensor network environment including fixed sensor nodes and the sensor network is configured to be of a form integrated partially from an overall linear structure.

In the following, the operations of the respective nodes in a semi-linear sensor network structure are explained in detail referring to FIG. 1.

At first, event report packets generated by sensor nodes, 101, 102, 105 and 107, that detect an event are reported eventually to a sink sensor node 106 through successive transmission between various nodes.

At this time a transmission sensor node of the network sends a long preamble to a reception sensor node and a reception sensor node is prevented from unnecessary reception by having a reception sensor node prepared to rest in a sleep state during the remaining idle period of a long preamble and then wake up later at the end of the long preamble. Besides, a neighboring sensor node switches to a sleep state upon recognizing that it is still not the object of reception, which is called a media access control method by the competition that seeks the maximum energy efficiency at a low throughput.

In the present invention, based on this method, short preambles including a destination address, remainder of preamble, length of data and collision avoidance (CA) flag information are sent repeatedly in order to wake up a sensor node at the next hop without a sleep delay during the remaining period of a long preamble so that a sleep delay is minimized by waking up the receiving node at the next hop before the reception node that receives complete short preambles switches to a sleep state.

At this time, a neighboring node receiving short preambles switches immediately to a sleep state and stays on until the completion of the final data transmission, leading to an increase of energy efficiency. Besides, if various transmission sensor nodes, 103, 104, 107 and 110, in the network are detected as being in a competition domain, 108 and 109, it is arranged to send successively reliable data packets by a dynamic collision resolution method based on collision avoidance after a channel sensing in this interval.

Figure 2:
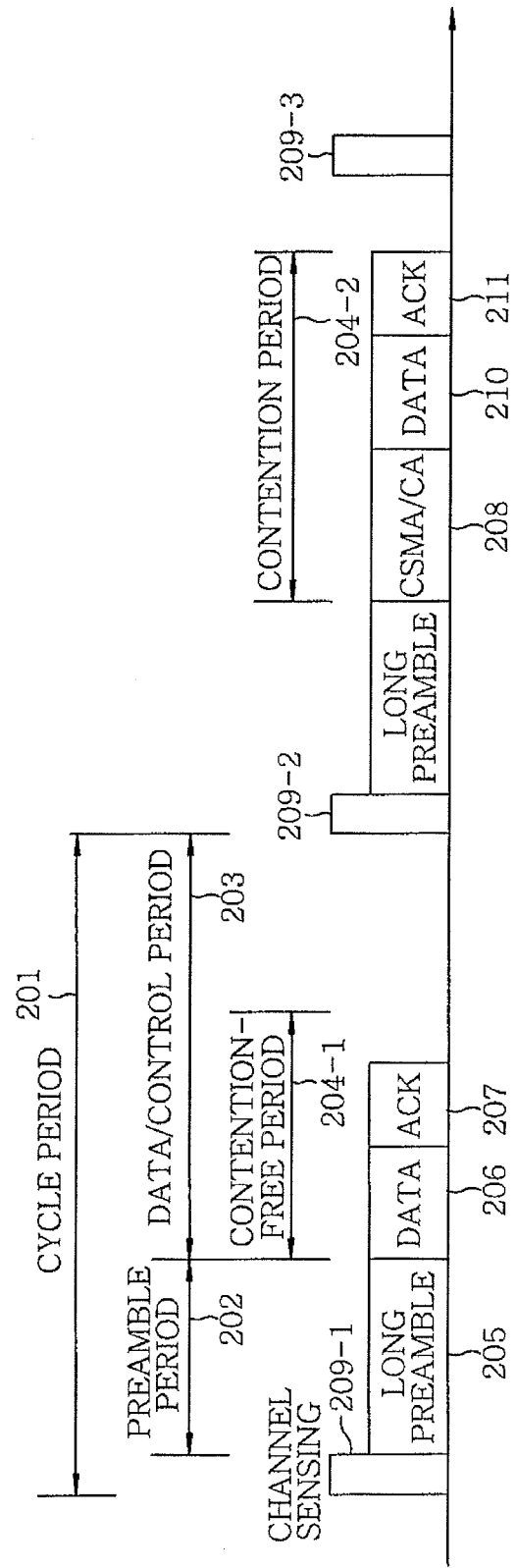
FIG. 2 illustrates an example of a cycle configuration for data transmission at a sensor node in accordance with an embodiment of the present invention.

FIG. 2 shows a configuration in a cycle period of a sensor node in a semi-linear sensor network in accordance with an embodiment of the present invention.

Referring to FIG. 2, a cycle period 201 is a time interval during which a cycle is carried out, for example, sensor node A, 101, senses a channel and sends a preamble and data. A cycle includes basically a period of channel sensing, 209-1 and 209-2, during which the initial state of a channel is recognized and a preamble period 202 in which a long preamble 205 is sent if the channel is in an idle state and has packets to transmit.

After this, a data/control period 203 for transmission of actual data and controls is added and the configuration of the data/control period 203 depends on whether it is a period with or without connection, 204-1 or 204-2.

In other words, in case the transmission path of a channel that is to send data is not a contention period 204-2, for example, sensor node A 101 recognizes as a connection-free period 204-1, sends immediately data packets 206 to send to sensor node B 103 and, in its confirmation, receives ACK 207 from sensor node B 103.

Contrary to this, in case the transmission path of a channel that is to send data lies in a competition domain 108 and 109, for example, sensor node A 101 recognizes as a contention period 204-2 and first carries out a collision resolution method 208, sends data packets 210 to transmit to sensor node B 103 and, in its confirmation, receives ACK 211 from node B 103.

Subsequently, after the completion of data transmission, it switches to a sleep state until the next channel sensing, 209-2 and 209-3, so that energy is prevented from being wasted unnecessarily.

At this time, a long preamble 205 must be sufficiently long so as to be recognized by a reception sensor node. If information about the duty cycle of a reception sensor node is absent, it must be long enough to be able to include the duty cycle of the receiving node. On the other hand, sensor nodes within the range of transmission of a long preamble should all receive a long preamble and stand by with energy being consumed until a target reception sensor node is designated. Such unnecessary overhearing is one of the factors that could lower the energy efficiency. Therefore, the overhearing and sleep delay can be minimized in the present invention by having a long preamble carry sufficient information in it.

Figure 3:
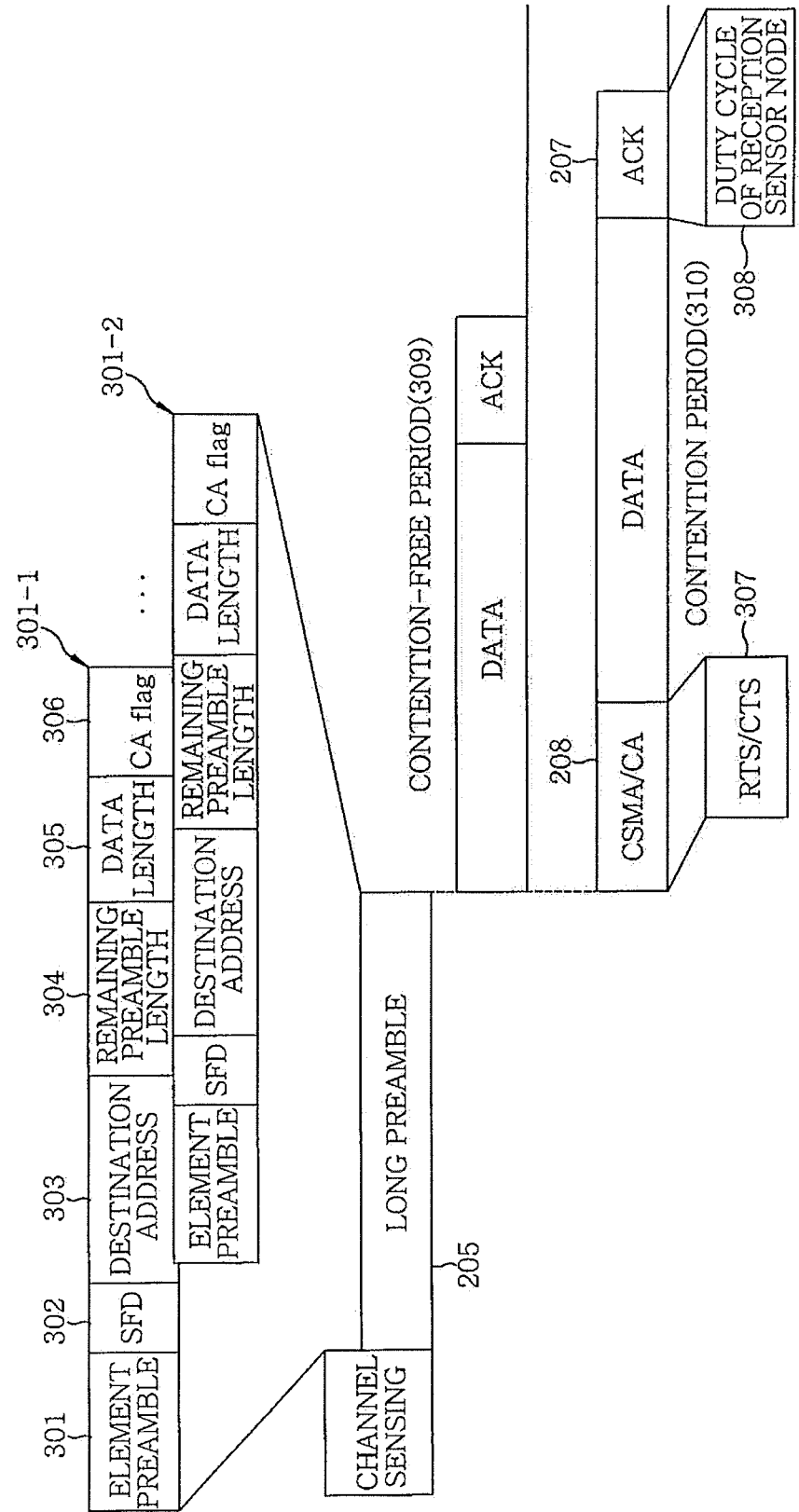
FIG. 3 offers a long preamble structure including several element preambles in accordance with an embodiment of the present invention.

FIG. 3 shows a long preamble structure in accordance with an embodiment of the present invention.

As shown in FIG. 3, a long preamble 205 includes duplicate element preambles, 301-1 and 301-2. The element preamble 301-1 includes a short preamble 301 for synchronization, a start frame delimiter (SFD) 302 indicating the start of a frame, a destination address 303 that carries the address of a destination receiving node, a remainder of preamble 304 that shows the number of remaining element preambles, a length of data 305 to be transmitted and a collision avoidance (CA) flag information showing the role of a sensor node in avoiding collisions.

If sensor nodes within the transmission range of a transmission sensor node receive the element preambles 301-1 and 301-2 completely, each of these sensor nodes identifies the destination address 303 in the element preamble and, if it does not match its own address, switches immediately into a sleep state and rests until the time of completion of the remainder of preamble 304, length of data 305 and collision avoidance (CA) flag 306 so as to be able to eliminate overhearing in this period.

If the destination address 303 in the element preamble 301-1 matches its own address, however, the sensor node switches as of now to a sleep state and rests until the time of completion of remaining preambles and start a wakeup operation at the beginning point of time of a contention-free period 309 or contention period 310, allowing reduction of unnecessary energy consumption.

On the other hand, the CA flag 306 in the element preamble 301-1 includes information about whether or not a collision avoidance process is carried out and the role played by a sensor node in case a collision avoidance process is carried out. If a collision avoidance process is needed, the portion beyond the long preamble 205 is treated as a contention period 310 and data transmission is carried out when RTS and CTS 307 are exchanged between the transmission and reception sensor nodes by a collision avoidance method 208 known as Carrier Sense Multiple Access with Collision Avoidance or CSMA/CA in short.

At this time, RTS transmission and RTS reception/CTS transmission are determined by CA flag 306. After the completion of reception of the element preamble 301-1 in the long preamble 205 by a reception sensor node, the reception sensor node may generate a long preamble that includes the address of a reception sensor node at the next hop. The reception sensor node that receives this at the next hop can estimate a wakeup time and, therefore, a sleep delay may be reduced.

The duty cycle on the transmission path in a semi-linear network shows an optimal state when it is adjusted continuously according to the size of the element preambles 301-1 and 301-2. Hence, a reception sensor node transmits its own duty cycle information to a transmission sensor node by including it in the duty cycle 308 of the reception sensor node residing in the ACK packet 207. As such, the transmission sensor node takes this into account to reset dynamically whether or not the long preamble 205 is transmitted and its length and such adjustment of duty cycles between sensor nodes allows minimized sleep delay at the sensor nodes.

Figure 4B:
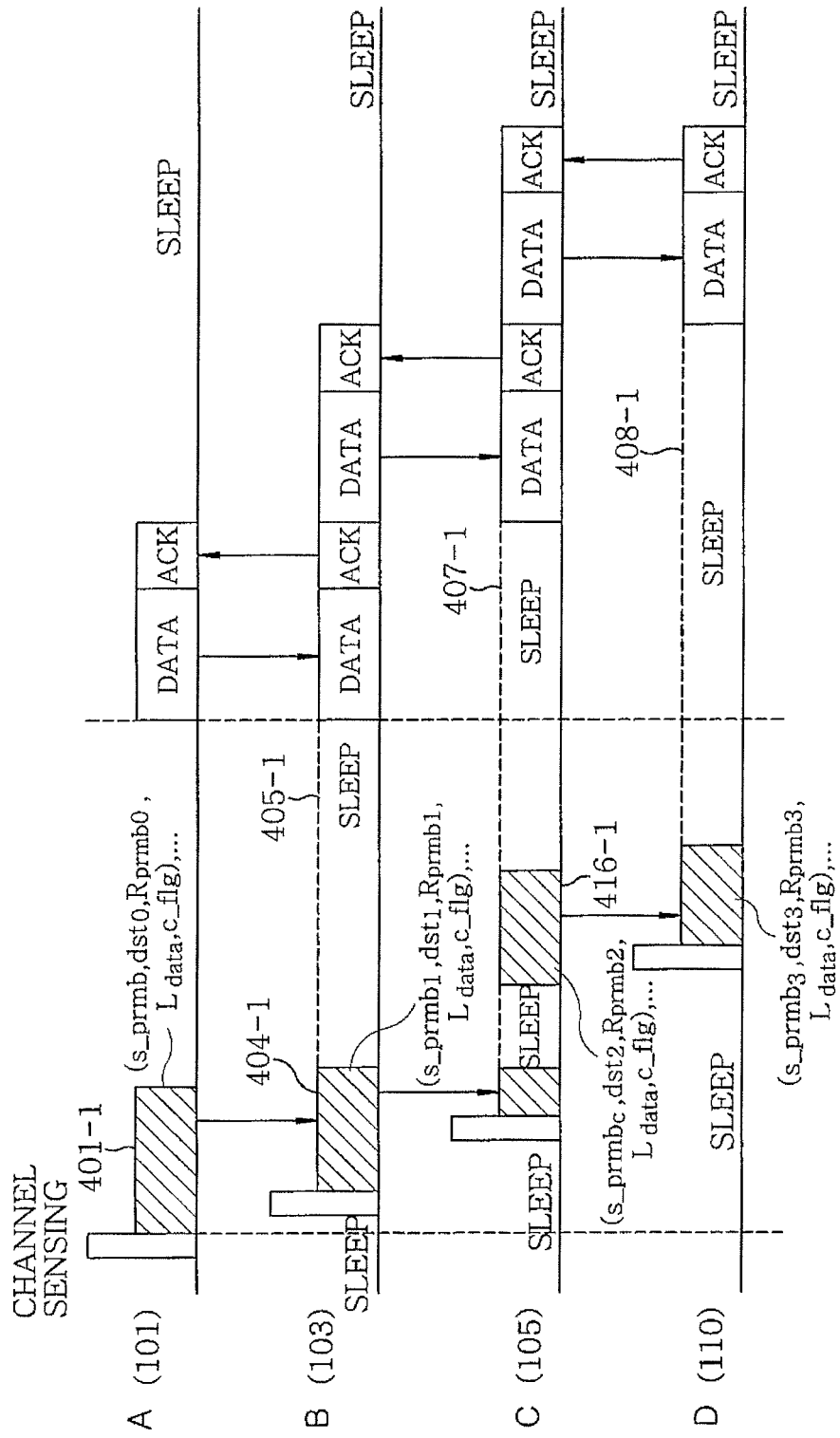

FIGS. 4A and 4B show a procedure of signal processing that adjusts a long preamble between sensor nodes in a semi-linear sensor network in accordance with an embodiment of the present invention.

As shown in FIG. 4A, before a long preamble is adjusted, terminal sensor node A 101 sends a long preamble 401 with the CA flag being zero (0) and the destination address (destination: B) being sensor node B 103. Thence, sensor node B 103 recognizes through an element preamble in the long preamble 401 that it is the destination.

Then, if there is enough room for transmission of a long preamble 401 of sensor node A 101, sensor node B 103 resends, before switching to a sleep state, element preambles including destination: C and CA: zero (0) in a certain proportion to the period of the long preamble 401 of sensor node A 101 and then switches to a sleep state.

After this, sensor node B 103 wakes up exactly before the point in time of data transmission from sensor node A 101, receives data 402-1 and sends ACK 403-1 to confirm it.

On the other hand, the long preamble 404 of sensor node B 103 is received by sensor node C 105. At this time, sensor node C 105 maintains a sleep state 406 until channel sensing of sensor node D 110 starts in the long preamble period 401 of sensor node A 101, wakes up at the channel sensing 415 of sensor node D 110 and sends element preambles 416 to sensor node D 110.

In other words, in the long preamble period 401 of sensor node A 101, sensor nodes B, C and D, 103, 105 and 110, respectively, wake up only when data transmission starts but do not carry out unnecessary overhearing prior to this, leading to an increase of energy efficiency. Because non-terminal sensor nodes B and C, 103 and 105, respectively, stand by for data transmission and reception of ACK immediately after they receive data and send ACK, non-terminal sensor nodes B, C and D, 103, 105 and 110, respectively, start data transmission after respective sleep state periods, 405, 407 and 408, of (actual data length+ACK) in proportion to the number of hops.

Then, by receiving the duty cycle of the reception sensor node residing in the ACK packet, the transmission sensor node on the transmission path is able to control the optimal length of the long preamble so as to proportionate to its own duty cycle.

FIG. 4B shows a procedure after the length of a long preamble has been controlled. Comparing FIG. 4B with FIG. 4A, it can be seen that the length of the long preambles, 401-1, 404-1 and 416-1, of sensor nodes has been adjusted to the duty cycle of reception sensor nodes on the transmission path and, therefore, transmission of unnecessary idle preambles has been eliminated. That is, early switch to sleep states, 405-1, 407-1 and 408-1, of transmission sensor nodes may lead to an increase in energy efficiency.

Figure 5:
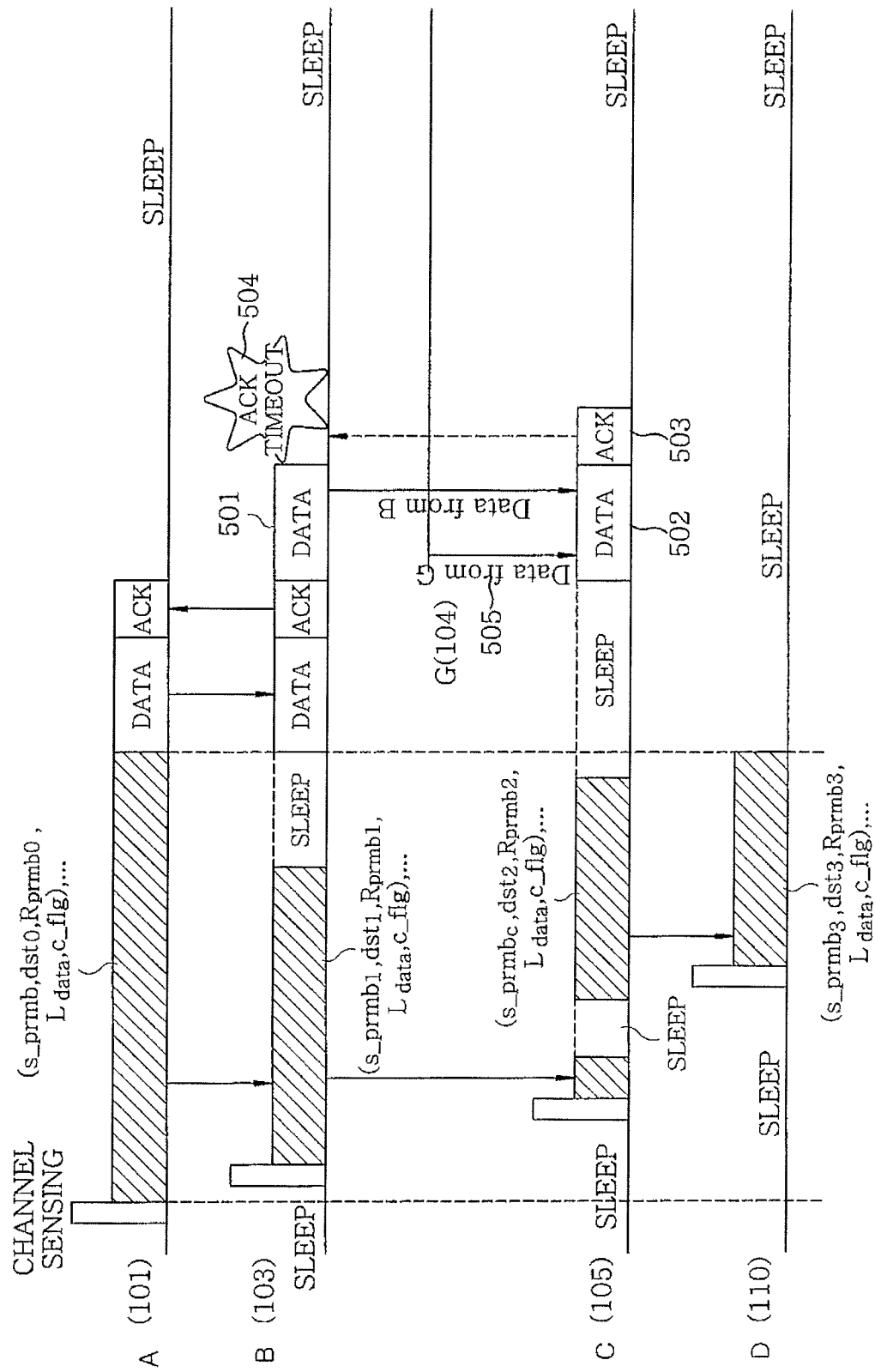
FIG. 5 depicts an example of collision detection on a transmission path in accordance with an embodiment of the present invention.

FIG. 5 shows a procedure of signal processing that detects collisions in a sensor network in accordance with an embodiment of the present invention.

Collisions may take place during transmission between sensor nodes on transmission path in a semi-linear sensor network. As shown in FIG. 5, a collision takes place if sensor node B 103 sends data 501 to sensor node C 105 at the same time sensor node G 104 sends data 505 in a duplicate manner.

If a collision takes place as such, data 502 received by sensor node C 105 is damages and, hence, ACK 503 is not sent. As a result, sensor nodes B and G, 103 and 104, detect an ACK timeout 504 since they stand by for ACK longer than the standby time.

Sensor node C 105 also detects a failure in data reception. In the present invention, a method that exchanges RTS requesting whether or not reception is possible and CTS allowing transmission using the CSMA/CA method is employed to resolve collisions in this period.

Figure 6:
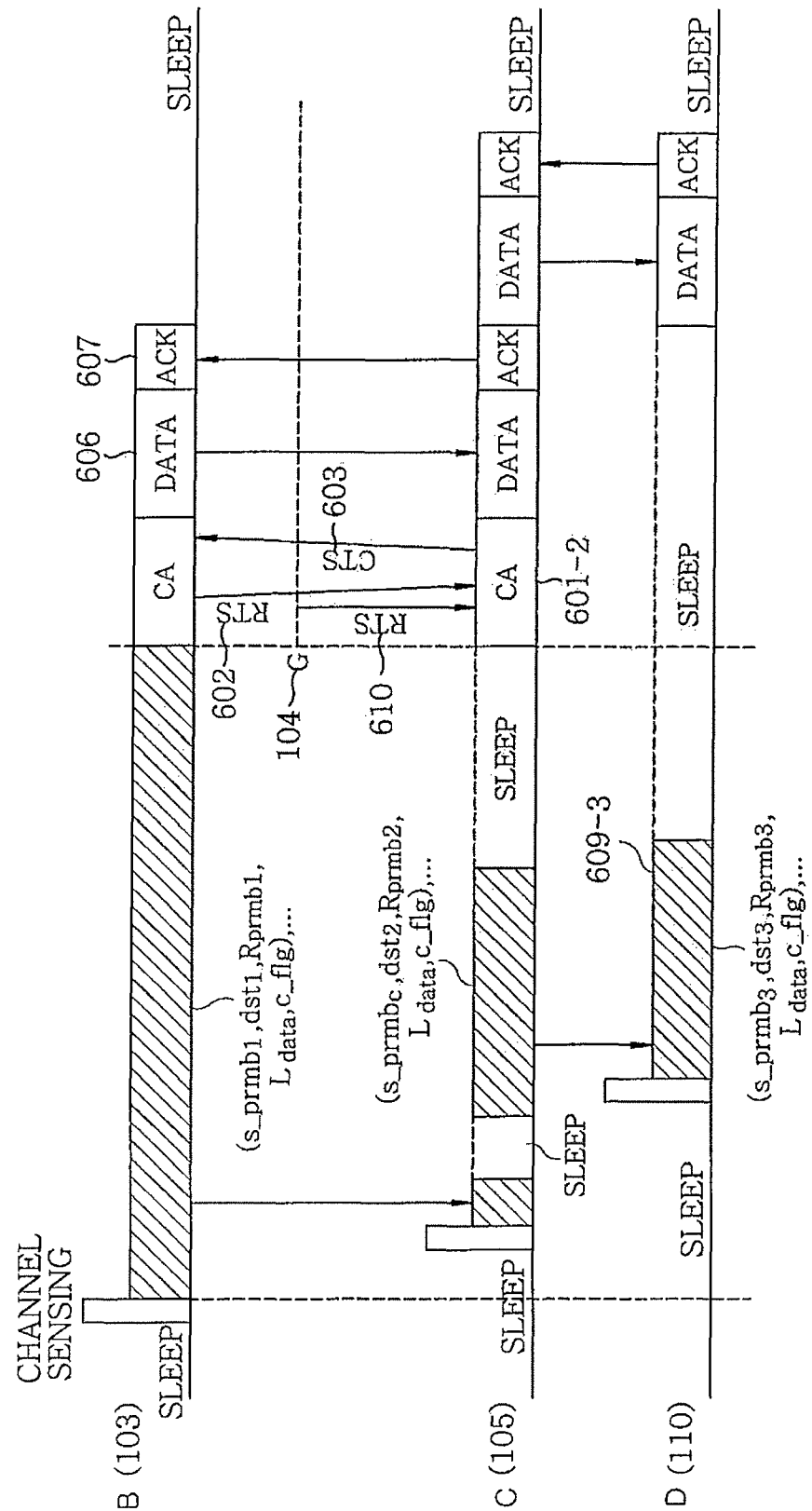
FIG. 6 presents an example of how collisions on a transmission path are resolved in accordance with an embodiment of the present invention.

FIG. 6 shows a procedure of signal processing that resolves collisions in a sensor network in accordance with an embodiment of the present invention.

In order to resolve collisions that take place, as in FIG. 5, between sensor nodes B, C and G, 103, 105 and 104, respectively, transmission sensor nodes B and G, 103 and 104, request RTS 602 and RTS 610, respectively, to sensor node C 105. And then sensor node B 103 receives CTS 603 from sensor node C 413, completes a procedure of collision resolution and then sends data 606 and receives ACK 607 after completion of data transmission. Next, sensor node G 104 tries to resend to sensor node C 105 in the next cycle period.

At this time, sensor node D 110 receives new element preambles 609-3 with the CA flag informing that sensor node C 103 carries out a procedure of collision resolution instead of the old element preambles and, therefore, an additional sleep state is maintained for a period corresponding to the collision resolution period 601-2 of sensor node C 105.

Figure 7:
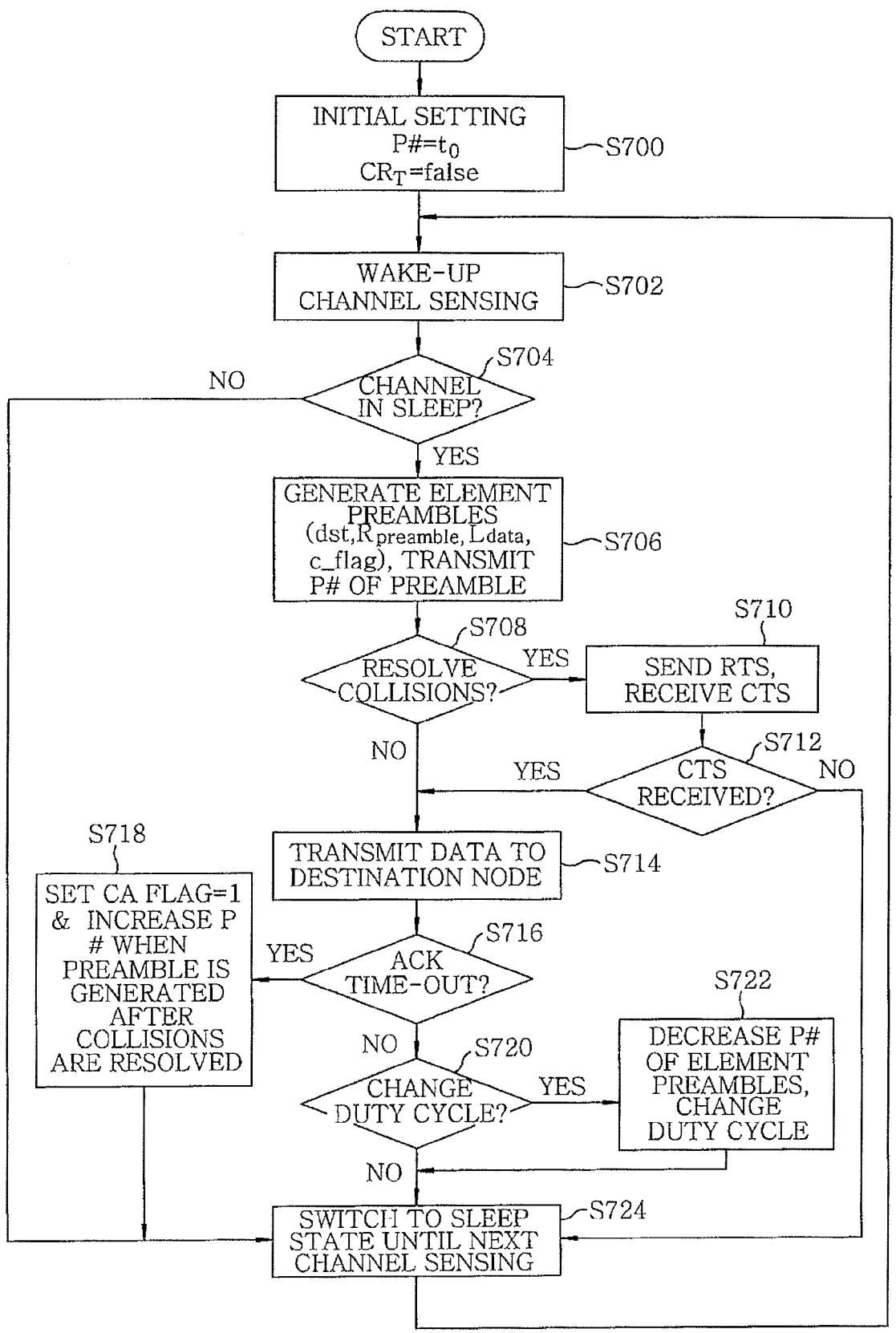
FIG. 7 shows a flowchart of a media access control at a terminal sensor node in accordance with an embodiment of the present invention.

FIG. 7 shows a flowchart of the media access control at a terminal sensor node in a semi-linear sensor network in accordance with an embodiment of the present invention. In what follows, this embodiment of the present invention is explained in detail with FIGS. 1 and 7.

A sensor node located at the terminal of a sensor network, for example, sensor node A 101, transmits data without receiving any. In the initial setting step S700, sensor node A 101 initializes the number P# of element preambles in the long preamble and the collision resolution method is set to be false, $CR_T$=false.

If transmission is attempted, sensor node A 101 wake up from a sleep state and carries out channel sensing in step S702 and examines whether the channel is idle in step S704.

At this time, if the data collected from a sensor is absent or the channel is in active state since it is already used by another sensor, sensor node A 101 switches to a sleep state S724 until the next channel sensing. If the data is present and there is no sensor node that uses the channel so that the channel is in idle state, however, sensor node A 101 generates immediately element preambles to send to the next sensor node, for example, sensor node B 103 and sends as much data as the number of the initialized element preambles in step S706.

Next, sensor node A 101 completes the transmission of preambles and examines whether to carry out transmission collision resolution just prior to transmission of data in step S708. If transmission collision resolution is to be carried out, i.e., $CR_T$=true, sensor A 101 sends RTS to its destination sensor node, sensor node B 103, and receives CTS from it in step S710. In this process, sensor node A 101 examines if CTS reception has succeeded or failed in step S712 and, if it's a failure, switches to a sleep state until the next channel sensing in step S724. If CTS reception is a success, it sends data to its destination sensor node, sensor node B 103, in step S714.

If sensor node A 101 does not need to carry out transmission collision resolution in S708, i.e., $CR_T$=false, then it sends data immediately to its destination sensor node, sensor node B 103, without going through RTS transmission and CTS reception processes in step S714.

After completion of data transmission, in order to confirm data transmission from sensor node B 103, sensor node A 101 examines whether ACK is received from its destination sensor node, sensor node B 103, in a given period of time in step S716.

If collisions have taken place during the data transmission so that ACK has not been received and ACK timeout occurs, sensor node A 101 sets $CR_T$=true in step S718 in order to carry out collision resolution at the next data transmission attempt and then switches to a sleep state until the next channel sensing in step S724. If ACK has been received since data transmission has been completed without any collisions, however, sensor node A 101 identifies duty cycle information of its destination sensor node, sensor node B 103, and examines whether the duty cycle has been modified in step S720. If the duty cycle of sensor node B 103 has been modified, sensor node A 101 adjusts (decreases) the number P# of element preambles to be transmitted and, comparing with the duty cycle information of sensor node B 103, determines the time of transmission of following element preambles in step S722. Here, ACK packet includes the duty cycle information of the destination sensor node.

As all the above processes are completed, sensor node A 101 maintains its sleep state until the next channel sensing in step S724.

Figure 8A:
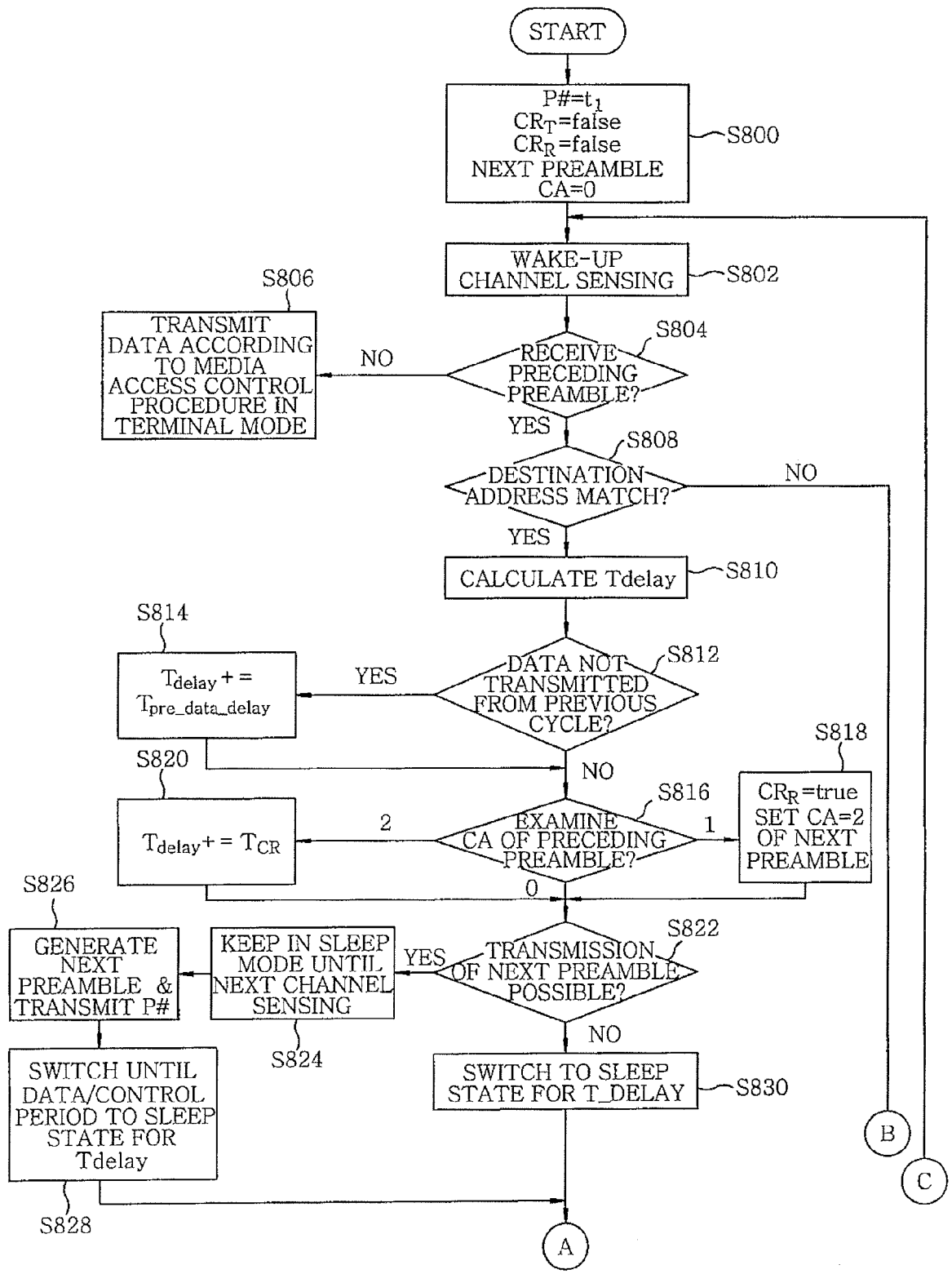
FIGS. 8A and 8B depict flowcharts of the media access control at a non-terminal sensor node in accordance with an embodiment of the present invention.
Figure 8B:
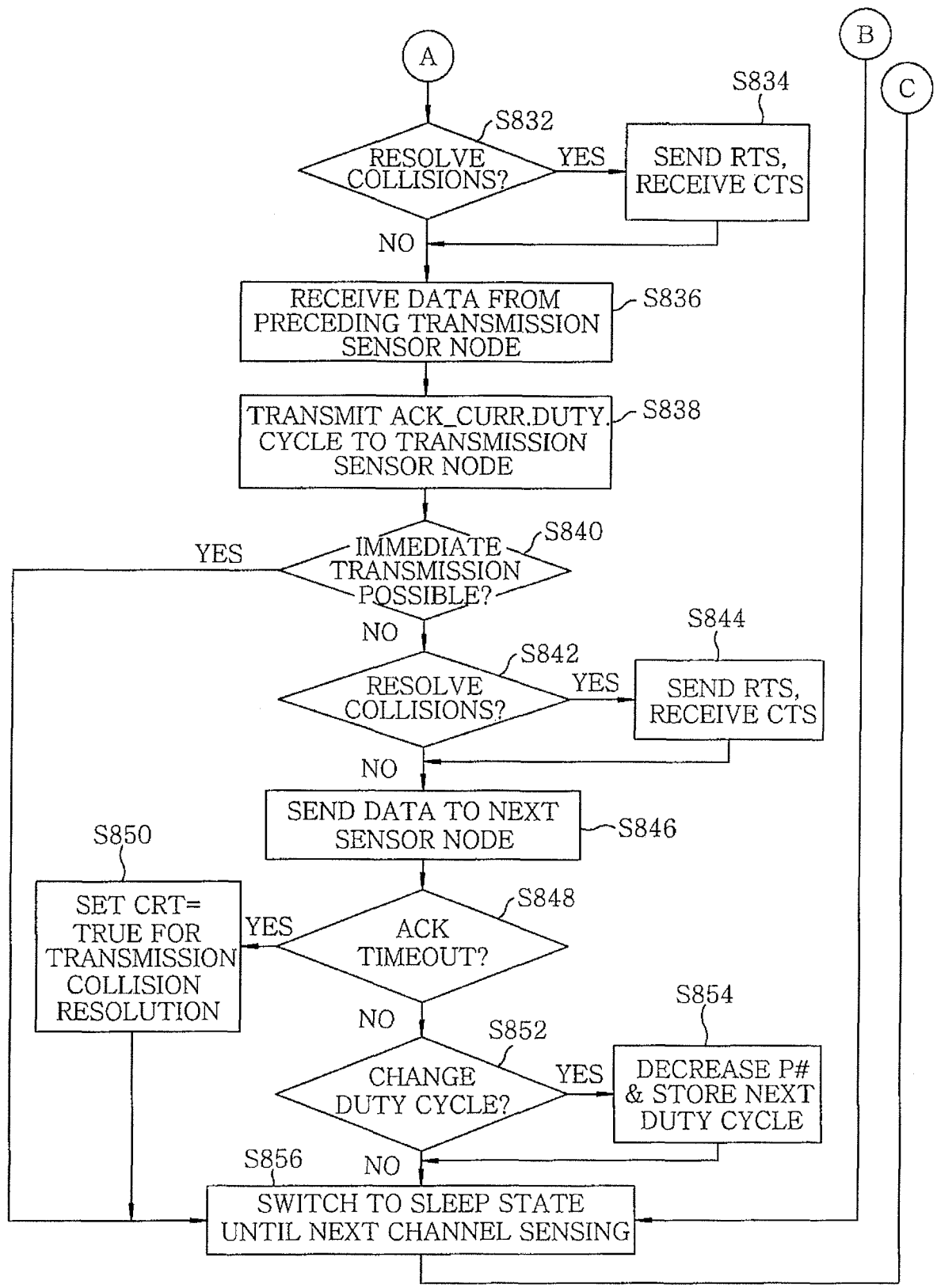

FIGS. 8A and 8B show flowcharts of the media access control at a non-terminal sensor node in a semi-linear sensor network in accordance with an embodiment of the present invention. In the following, the embodiment of the present invention is explained in detail with FIGS. 1, 2, 8A and 8B.

In the first place, a sensor node located at a non-terminal of a sensor network, for example, sensor node B 103, has a characteristic that it receives data and then retransmits the data afterwards. In the initial setting step S800 of sensor node B 103, the number P# of element preambles to transmit, collision resolution at the transmitter $CR_T$ and collision resolution at the receiver $CR_R$ are all set to be false.

Next, sensor node B 103 wakes up from a sleep state, senses channel in step S802 and, if not in idle state, switches again to a sleep state.

If the channel is in idle state, however, it examines whether or not a preceding preamble has been received in step S804. If there are data to be transmitted but any preceding preamble has not been received, sensor node B 103 transmits data according to a media access control method for a conventional terminal sensor node in step S806. If the examination yields reception of a preceding preamble, sensor node B 103 compares the destination address in the preamble with its own address to examine their agreement in step S808.

If it turns out that the destination address does not agree with its own address, sensor node B 103 switches to a sleep state immediately to eliminate any unnecessary overhearing in step S856. If the destination address agrees with its own address, however, sensor node B 103 calculates the wakeup time $T_{delay}$ based on the remainder of preamble and length of data residing in the preamble in step S810.

Next, sensor node B 103 examines if prior transmission has failed and, therefore, there is additional data that needs to be transmitted in addition in step S812. At this time, if there exists additional data that was not transmitted in the previous cycle, sensor node B 103 adds the transmission time $T_{pre\_data\_delay}$ for the corresponding data to the wakeup time $T_{delay}$, in step S814.

Subsequently, sensor node B 103 identifies CA flag of the previous preamble including a case any additional data does not exist in step S816. That is to say, if CA flag is one (1), because a previous transmission sensor node, for example, sensor node A 101 sends RTS in order to resolve collisions, sensor node B 103 has to carry out RTS reception and CTS transmission to resolve collisions $CR_R$=true and sets CA flag to two (2) in step S818 in order to inform a next sensor node, for example, sensor node C of a necessity of maintaining a sleep state additionally for a period of collision resolution process. Besides, when CA flag is two (2), it is meant that a previous transmission sensor node, for example, sensor node A 101 is carrying out collision resolution and, therefore, the time for such collision resolution $T_{CR}$ is added to the wakeup time $T_{delay}$, i.e., $T_{delay}$+=$T_{CR}$, in step S820.

When the process is completed according to CA flag as in the above, a non-terminal sensor node, sensor node B 103, examines to see if a next preamble can be transmitted to a next sensor node, for example, sensor node C 105, in step S822. If it turns out that the transmission is possible, sensor node B 103 maintains a sleep state for a time interval $T_{pre\_data\_delay}$ until the next channel sensing of a next sensor node on the transmission path in step S824, and then wakes up, generates the next preamble and transmits it in step S826. Subsequently, sensor node B 103 switches to a sleep state until the data/ control period 203, in step S828. Even when it is not possible to transmit the preamble to the next sensor node, sensor node B 103 switches to a sleep state until the data/control period 203, in step S830.

After that, sensor node B 103 waking up from a sleep state at the starting time of the data/control period 203 examines whether to carry out reception collision resolution $CR_R$, in step S832, performs RTS reception and CTS transmission if collision resolution is to be carried out in step S834, and receives data from a previous transmission sensor node, for example, sensor node A 101, in step S836. If receiving collision resolution has not been carried out, however, sensor node B 103 starts immediately to receive data from a previous transmission sensor node, sensor node A 101, in step S836.

If data reception is completed successfully at this time, sensor node B 103 sends ACK including its own duty cycle information to a transmission sensor node, sensor node A 101, in step S838.

Next, sensor node B 103 examines if it is possible to resend the received data immediately to a next transmission sensor node, for example, sensor node C 105, in step S840, and, if the transmission is not possible, maintains a sleep state until the next channel sensing in step S856.

If retransmission is possible, on the contrary, sensor node B 103 examines if it is necessary to carry out collision resolution $CR_T$, in step S842. If transmission collision resolution is needed, sensor node B 103 carries out RTS transmission and CTS reception to/from sensor node C 105 in addition in step S844. If transmission collision resolution is not needed, sensor node B 103 starts immediately to send data to a next sensor node, for example, sensor node C 105, in step S846. Afterwards, sensor node B 103 stands by for reception of ACK from the next sensor node, sensor node C 105, in step S848.

If it fails to receive ACK in a given time and ACK timeout occurs, sensor node B 103 sets $CR_T$=true for transmission collision resolution to be performed in step S850 and switches to a sleep state until the next channel sensing in step S856.

If ACK has been successfully received, however, sensor node B confirms the duty cycle information of sensor node C 105 included in ACK and then examines if the duty cycle has been modified in step S852. If the duty cycle of sensor node C 105 has been modified, sensor node B 103 adjusts the number P# of the next element preambles and next duty cycle corresponding to the change in the duty cycle in step S854 and then switches to a sleep state until the next channel sensing. If the duty cycle has not been modified, sensor node B 103 switches immediately to a sleep state in step S856.

As has been described in the above, in the present invention, a low duty cycle based on a contention method in order is selected to satisfy low-power, reliability and real-time characteristics and multiple hops possibly allowable in a single duty cycle are supported in a network that is connected mutually organically for real-time situation report so that improvement can be made in a dynamical manner.

In other words, application of a high duty cycle is an unnecessary overhead since real-time processing application service centered around outbreak of events takes place rather rarely and events breaking out concurrently must be transmitted by all means within the range of an allowable period of time. Here, a low duty cycle has a great shortcoming that a long sleep delay is involved in proportion to the number of hops participating in a transmission. Therefore, in a sensor network of real-time report type to which the present invention is applied, it is configured to make transmission extend to next sensor nodes at several hops in the corresponding duty cycle. To achieve this, in a long preamble are included repeatedly short preambles consisting of information by which a sensor node receiving the long preamble can estimate and treat operations on the next sensor node. Through this, a sensor node at the next hop wakes up at a suitable point in time and stands by for reception so that it is possible to decrease a sleep delay sufficiently as well as minimize unnecessary overhearing of neighboring sensor nodes, allowing the enhancement of energy efficiency of individual sensor nodes.

Besides, collisions might occur due to contention among sensor nodes during transmission and addition of a new network. Because resolution of collisions in a sensor network gives rise to additional energy consumption and transmission delay, it is configured in the present invention that the situation regarding collisions is shared and, according to this, transmission is attempted through contention among object sensor nodes that cause collisions. The object sensor nodes causing these collisions maintain a sleep state for a while and when they reach this contention period they get a hold of control by contention. Of course, a sensor node at the next hop detects collisions at the previous step and, with the recognition of collision resolution process according to this, the wake-up time is dynamically adjusted in order not to generate unnecessary idle listening. The detection and resolution of collisions are determined dynamically at this step and, therefore, if collisions due to external factors are naturally resolved in a continuous monitoring process, this collision resolution process is also dynamically eliminated. Through this process, it is possible to enhance the energy efficiency by minimizing unnecessary usage of protocol overheads as well as avoid various collisions that can take place in a real sensor network environment.

While the invention has been shown and described with respect to the embodiments, it will be understood by those skilled in the art that various changes and modifications may be made without departing from the scope of the invention as defined in the following claims.

What is claimed is:

1. A low-power method for media access control on a semi-linear sensor network with multiple sensor nodes, comprising:
    sensing a channel after waking up from a sleep mode by an arbitrary transmission sensor node that has obtained data;
    generating a long preamble including a number of element preambles and sending to a destination sensor node after said channel sensing;
    sending said data to said destination sensor node after completion of transmission of said long preamble; and
    identifying duty cycle information of said destination sensor node after completion of transmission of said data and adjusting the number of said element preambles according to said duty cycle information, and
    wherein said element preambles include a destination address, remainder of preamble, length of data and collision avoidance (CA) flag information.

2. The method of claim 1, wherein said data sending includes:
    examining status of a channel through which said data are to be sent for transmission of data to said destination sensor node after completion of transmission of said long preamble;
    resolving collisions if said channel is in a contention period during which data collision takes place; and
    sending data to said destination sensor node after completion of collision resolution.

3. The method of claim 1, further comprising:
    determining a point of time at which said element preambles are sent according to duty cycle information of said destination sensor node after completion of transmission of said data.

4. The method of claim 1, further comprising switching said transmission sensor node to a sleep state until a next channel sensing in case said sensed channel is occupied by another sensor node during said channel sensing.

5. The method of claim 1, wherein said CA flag information keeps information about whether or not collisions between said transmission sensor node and destination sensor node have been resolved.

6. The method of claim 2, wherein, in said solving collisions, said transmission sensor node sends read-to-send (RTS) to said destination sensor node and receives clear-to-send (CTS) from said destination sensor node replying to said RTS.

7. The method of claim 6, wherein, if said CTS has not been received, said transmission sensor node is switched to a sleep state until a next channel sensing.

8. The method of claim 1, wherein said transmission sensor node sets CA flag information of a next element preamble to be information instructing to perform resolution of collisions if collisions take place during transmission of data to said destination sensor node.

9. A low-power method for media access control on a semi-linear sensor network with multiple sensor nodes, comprising:
    receiving a long preamble including multiple element preambles in an arbitrary reception sensor node after channel sensing at a transmission sensor node in said sensor network;
    examining destination information of said element preambles at the reception sensor node in said sensor network to identify if said sensor node is a destination sensor node;
    switching said destination sensor node into a sleep state after calculating a wake-up time for data reception from said transmission sensor node;
    receiving data sent from said transmission sensor node upon waking up from sleep mode at said wake-up time; and
    resending said data to next destination sensor node after completion of receiving said data, and
    switching said destination sensor node immediately into a sleep state if destination information in said element preambles is not identical to its own address.

10. The method of claim 9, further comprising:
    sending its own duty cycle information of said destination sensor node to said transmission sensor node after completion of receiving said data.

11. The method of claim 9, wherein said receiving data includes:

waking up said destination sensor node from sleep mode at a time of data transmission from said transmission sensor node;

examining if a channel at the time of transmission of said data is in a contention period during which collisions take place;

performing a collision resolution through a transmission process of RTS and CTS between said transmission sensor node and said destination sensor node if in said contention period; and receiving said data in an idle mode of said channel due to said collision resolution.

12. The method of claim 9, wherein said resending data includes:

examining if it is possible to resend said received data to next destination sensor node after completion of receiving said data; and resending said data to said next destination sensor node if resending is estimated possible by said examination.

13. The method of claim 12, wherein said data resending includes:

examining if a channel at the time of resending said data is in a contention period during which collisions take place;

performing a collision resolution through a transmission process of RTS and CTS between said destination sensor node and next destination sensor node if in said contention period; and sending said data to said next destination sensor node in an idle mode of said channel due to said collision resolution.

14. The method of claim 9, further comprising:

receiving duty cycle information of said next destination sensor node by said destination sensor node after completion of resending said data; and adjusting the number of element preambles and next duty cycle if said duty cycle information has been changed.

15. The method of claim 14, further including switching said destination sensor node immediately into a sleep state if said duty cycle information has not been changed.

16. The method of claim 11, wherein a wake-up time of said destination sensor node is calculated by using said remainder of preamble and data length information in said element preambles.

17. The method of claim 16, wherein, if additional data exists in said destination sensor node due to a failure during previous transmission, a wake-up time of said destination sensor node is calculated by adding a transmission time interval for said additional data.

18. The method of claim 17, wherein said destination sensor node is kept further in sleep mode for a next duty cycle, the time interval to next channel sensing in the course of transmission, if it is not immediately possible to send element preambles to said next destination sensor node at said wake-up time.

* * * * *